US010508820B2

(12) United States Patent
Quadroni et al.

(10) Patent No.: US 10,508,820 B2
(45) Date of Patent: Dec. 17, 2019

(54) DEVICE FOR PRODUCING WATER DROPLETS FOR AIR HUMIDIFICATION AND A HUMIDIFICATION SYSTEM WITH SUCH DEVICES

(71) Applicant: Condair Group AG, Pfäffikon (CH)

(72) Inventors: Dario Quadroni, Siebnen (CH); Matthias Streiff, Glarus (CH); Remo Bucher, Lachen (CH)

(73) Assignee: Condair Group AG, Pfäffikon (CH)

( * ) Notice: Subject to any disclaimer, the term of this patent is extended or adjusted under 35 U.S.C. 154(b) by 243 days.

(21) Appl. No.: 15/506,148

(22) PCT Filed: Sep. 28, 2015

(86) PCT No.: PCT/CH2015/000143
§ 371 (c)(1),
(2) Date: Feb. 23, 2017

(87) PCT Pub. No.: WO2016/049785
PCT Pub. Date: Apr. 7, 2016

(65) Prior Publication Data
US 2017/0276387 A1 Sep. 28, 2017

(30) Foreign Application Priority Data
Oct. 1, 2014 (EP) ..................... 14003395

(51) Int. Cl.
*B01F 3/04* (2006.01)
*B01J 19/32* (2006.01)
(Continued)

(52) U.S. Cl.
CPC ............ *F24F 6/12* (2013.01); *B01F 3/04021* (2013.01); *B01J 19/32* (2013.01);
(Continued)

(58) Field of Classification Search
CPC .................. B01F 3/04021; B01J 19/32; B01J 2219/32286; F24F 2006/008; F24F 6/00; F24F 6/12; Y02B 30/542
See application file for complete search history.

(56) References Cited

U.S. PATENT DOCUMENTS 6,863,224 B2   3/2005   Terada et al.
8,910,627 B2   12/2014  Iwatschenko et al.
(Continued)

FOREIGN PATENT DOCUMENTS

JP    9135877       5/1997
JP    2006292249    10/2006
(Continued)

*Primary Examiner* — Cabrena Holecek
(74) *Attorney, Agent, or Firm* — Cooper & Dunham LLP

(57) ABSTRACT

A humidification device (1) is shown wherein water is nebulized by a vibrating mesh with very small holes. The mesh is part of a reservoir which is fed by a valve arrangement which allows to direct water from a conduit over several water lines within the device either back to the conduit or into the reservoir. The device and a system with such devices allow to humidify and/or cool compartments such as rooms with a very fine mist of water which is hardly visually detectable. The system and device is adapted to be part of a permanent installation with low maintenance.

16 Claims, 2 Drawing Sheets

(51) Int. Cl.
*F24F 6/00* (2006.01)
*F24F 6/12* (2006.01)

(52) U.S. Cl.
CPC ....... *B01J 2219/32286* (2013.01); *F24F 6/00* (2013.01); *F24F 2006/008* (2013.01); *Y02B 30/542* (2013.01)

(56) References Cited

U.S. PATENT DOCUMENTS

| | | |
|---|---|---|
| 9,545,490 B2 | 1/2017 | Iwatschenko et al. |
| 2002/0163090 A1 | 11/2002 | Chu |
| 2017/0267551 A1* | 9/2017 | Saitou ...................... F24F 6/00 |

FOREIGN PATENT DOCUMENTS

| | | | |
|---|---|---|---|
| JP | 200823026 | 2/2008 | |
| KR | 10-20120023668 | 3/2012 | |
| KR | 1020140106985 | 9/2014 | |
| WO | 2008100077 | 8/2008 | |
| WO | WO-2008100077 A1 * | 8/2008 | ................ F24F 6/12 |
| WO | 2010015124 | 2/2010 | |
| WO | 2014133273 | 9/2014 | |

\* cited by examiner

DEVICE FOR PRODUCING WATER DROPLETS FOR AIR HUMIDIFICATION AND A HUMIDIFICATION SYSTEM WITH SUCH DEVICES

CROSS REFERENCE TO RELATED APPLICATIONS

This application is a § 371 national stage of PCT International Application No. PCT/CH2015/000143, filed Sep. 28, 2015, claiming priority of European Patent Application 14003395.2 filed Oct. 1, 2014, the contents of each of which are incorporated herein by reference in their entireties.

TECHNICAL FIELD

The invention relates to a device for producing water droplets, to a method of operating such a device and to a system for the humidification of compartments using such devices.

BACKGROUND ART

There are well known devices for air humidification by evaporating water. It has been contemplated as well to use finely atomized water droplets for decentralized air humidification (16. Status-Seminar "Forschen und Bauen im Kontext von Energie und Umwelt", 2./3. September 2010, Ch. Vogel, Dr. A. Grüniger, Dr. B. Wellig, "Ein behagliches Raumklima durch direkte adiabate Raumluftbefeuchtung mit Tropfen (DART)"). However, this concept has so far not been used in practical installations fit for every-day use. WO 2008/100077 A1 shows a humidifier to be built-in and in connection with a water pipe of a building. This humidifier uses a piezoceramic vibrator at the bottom of a reservoir and provides for atomized water rising from the reservoir and being discharged above the reservoir. For preventing germs when the humidifier stops and a predetermined amount of water remains in the reservoir, a drier is suggested for removing water in the reservoir. WO 2010/015124 A1 shows another humidifier with a reservoir, an ultrasonic transducer at the bottom of the reservoir and a mist guiding duct extending upwardly from the reservoir. US 2002/0163090 A1 and JP 2006292249 A show humidifiers as well.

DISCLOSURE OF THE INVENTION

The problem to be solved by the present invention is therefore to provide an improved humidifier and in particular to provide a cost and energy efficient and hygienically nonhazardous humidification of rooms or other compartments with very small droplets of water which is adapted for permanent installation in cabinets, such as rooms and other compartments, and which is suitable for every-day use with a long life-cycle of the installation.

This problem is solved by a device and a system according to the present invention.

The device comprises a through duct with an inflow connector and an outflow connector for connection to a water conduit, a valve arrangement with water lines connecting to said duct and to a reservoir of the device, said valve arrangement being provided for filling the reservoir up to a predetermined fill-level, the reservoir being closed on one side by a perforated membrane or mesh, respectively, of a droplet generator of the device, the mesh being arranged to be covered on one side of the mesh by water being present in said reservoir and the mesh forming the water droplet outlet of the device releasing droplets from the other side of the mesh when the mesh of the droplet generator is vibrated, the device further comprising a control unit for controlling the valve arrangement and the droplet generator.

It has been found that such a device with the mesh droplet generator in combination with the through duct with inlet and outlet to the reservoir and with the controlled valve arrangement results in a device that can securely avoid the leaking of water when such devices are installed on a wall or roof of a compartment, in particular a room, and can securely avoid residual water in an amount that may pose hygienic problems. When used in the system for humidification or adiabatic cooling of several compartments, such as rooms or cabinets or terrariums, comprising a closed ring water conduit leading to the several compartments, such devices allow the controlled, safe humidification of the compartments. The devices are connected in series into the water line and are arranged to release droplets into the respective compartment. At least one humidification sensor and in particular one humidification sensor per compartment, allows the control of one or several devices.

In a preferred embodiment the reservoir is provided with a pressure equalizing opening at a point away from the mesh and above the fill-level of the reservoir. Such an opening allows to passively avoid an overpressure on the mesh and thus performs this function very securely and independently of the valve control. A mesh overpressure might lead to water dropping out of the mesh by drops so large that they may be visually detected as such or may be harmful to furniture or goods in the compartment. As well the mesh itself may be harmed by overpressure and its lifetime may be reduced. The device and system is improved in this respect by the preferred embodiment.

In a further preferred embodiment the device allows to flush the water lines and comprises to this end a throttle within the duct and the valve arrangement is provided with a first line connecting with the duct at an upstream point of the duct ahead of the throttle and a second line connecting with the duct at a downstream point of the duct after the throttle, and with a third line leading to the reservoir, the valve arrangement being controllable by the control unit to connect in one position of the valve arrangement the first line and the second line within the valve arrangement while the third line is disconnected from the first and second line and to connect in a second position of the valve arrangement the third line with the duct. Flushing of water lines of the valve arrangement assures that no hygienic hazards may be posed by the device and system at all time.

It is further preferred that the device and in particular its valve arrangement comprises a level detector arranged to detect the predetermined fill-level of water within the reservoir. This allows to control the amount of water in the reservoir to be on the safe side regarding reservoir water pressure on the mesh and thus to optimize mesh lifetime. In a preferred embodiment the level detector works with a first fill-level electrode and a second fill-level electrode to provide for a measurement of electrical conductivity of water in said reservoir. An additional fill-level in particular in between empty level and full level may be provided by a third electrode which is provided and arranged for detecting a further fill-level. A preferred embodiment uses the metallic or metalized mesh as the second fill-level electrode. On the other hand for full control over the device and system it is preferred that a low-level sensor is provided to detect a zero-level of water in said reservoir by a sensor signal and in particular wherein the low-level detector comprises the mesh.

To avoid any chance of contamination of the water in the reservoir for the embodiment with an overpressure opening, such opening is provided with an air-permeable particle-tight closure, in particular a hydrophobic membrane. In a further preferred embodiment the water line providing water from the valve arrangement to the reservoir opens to the reservoir at a position that allows the mesh to be flushed by the water entering the reservoir. This allows to remove air bubbles that may be present on the mesh this flushing water stream when the reservoir is filled.

A further aspect of the invention is a method for operating the device according to claim 12. Accordingly, upon a humidification request or a request for adisbatic cooling by water droplets, for example by a sensor signal that signals to the controller that the air in the compartment is below a humidity threshold, the reservoir is filled with water from the duct up to the fill-level by controlling the valve arrangement. After the fill-level has been reached the valve arrangement stops further water supply to the reservoir and the valve arrangement is continuously or regularly purged with water from the duct passing from the duct through the water lines leading from the duct to the valve arrangement and from there back to the duct, and that water droplets are generated from the water contained in the reservoir by vibratingly driving the mesh.

After the water in the reservoir has been fully used up, depending on an ongoing humidification request or no humidification request, either the steps of filling and droplet generation are repeated, or only the water lines and valve arrangement purging is continued while the reservoir is left empty.

Other advantageous embodiments are listed in the dependent claims as well as in the description of preferred embodiments below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
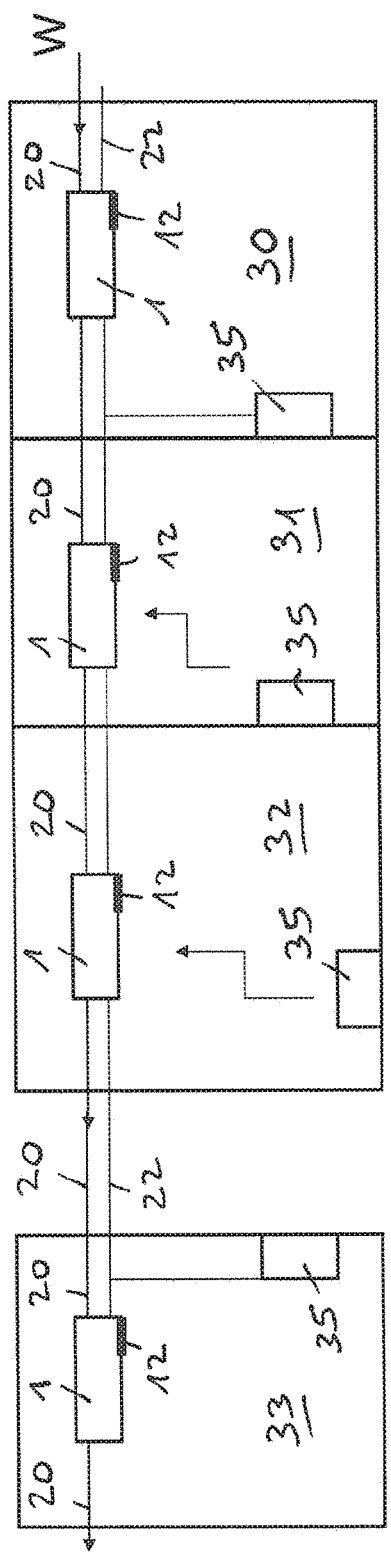
FIG. 1 shows schematically several compartments that are humidified or cooled by the device, system and method according to the invention.

FIG. 1 shows four compartments. Such compartments may be rooms of a building, such as office rooms or living rooms. The compartments may as well be display cabinets for food, terrariums, refrigerators or any other compartments that shall be humidified and/or cooled by adiabatic cooling which can be effected with a very fine mist of water droplets or in other words nebulized or atomized water as well.

The number of compartments, for example rooms is of course not limited. Only one compartment may be humidified as explained below or a very large number of compartments. Doors and windows and other features of the compartments are not shown for the sake of simplicity of the drawings. A water conduit 20 is shown that comes from a water source and leads to all rooms that shall be humidified. The water can be tap water or can preferably be demineralized water that may have been additionally treated by ozonisation or with UV light and/or may have been treated with silver ions. The water flows in the conduit 20 in direction of the arrow W.

Humidification devices 1 are arranged in this conduit and are connected in series with the conduit as will be explained with regard to FIG. 2 which shows an example for such a device. Accordingly, each device 1 has for series connection with the conduit an inlet connection for water entering from the conduit and an outlet connection for water flowing out of the device back into the conduit. An electrical supply is as well connected to each device. The supply may be individual for each device or may be provided, as shown, by an electrical supply cable 22 that leads trough the compartments as well. Preferably the supply voltage for the devices is a low voltage, so that the cable may in most countries be combined with the water supply line, since this low voltage is not dangerous. In addition to the electrical supply, such a cable 22 may comprise electrical control lines that are connected to the controller of each device.

A sensor 35 for humidity is preferably present in each compartment. The sensor 35 may be connected to the controller of each device 1 wirelessly, as shown in one of the compartments by an arrow directed from the sensor 35 to the device 1. The connection may be a Bluetooth connection. Or the sensor may be electrically connected to the cable 22 and may thus be in connection by wire with the controller of the corresponding device 1. The sensor 35 may as well be part of the device 1 as shown as an example in FIG. 2. Preferably each compartment has a sensor 35 which is connected to the device 1 in the same compartment. It may as well be provided that one sensor is provided for two or more devices 1 which then are reacting to the same sensor signal or humidification request, respectively.

Each device 1 has an outlet 12 for the nebulized water. Instead of the term "nebulized" the term "atomized" is used as well. The term "droplets" is here used for the very fine water drops that are generated by a vibrating mesh or membrane, respectively, with microholes. This technique is in particular known from medical nebulizers for inhalation purposes. A mesh with a large number of very fine holes is provided. On the one side of the mesh there is a liquid—in the present invention just water—and the holes are so fine that water will not pass the static mesh. When the mesh is vibrated with some Kilohertz, however, tiny water droplets pass the mesh and exit on the other side of the mesh as a mist with a very small size of water droplets. Such perforated membranes or meshes, respectively, and the piezoelectric vibrating means and the electrical generator for providing the vibration are well known to the skilled person and are available on the market. The mesh, the piezoelectric drivers and the generator circuit are not explained in detail here since these parts and their connection is known.

Figure 2:
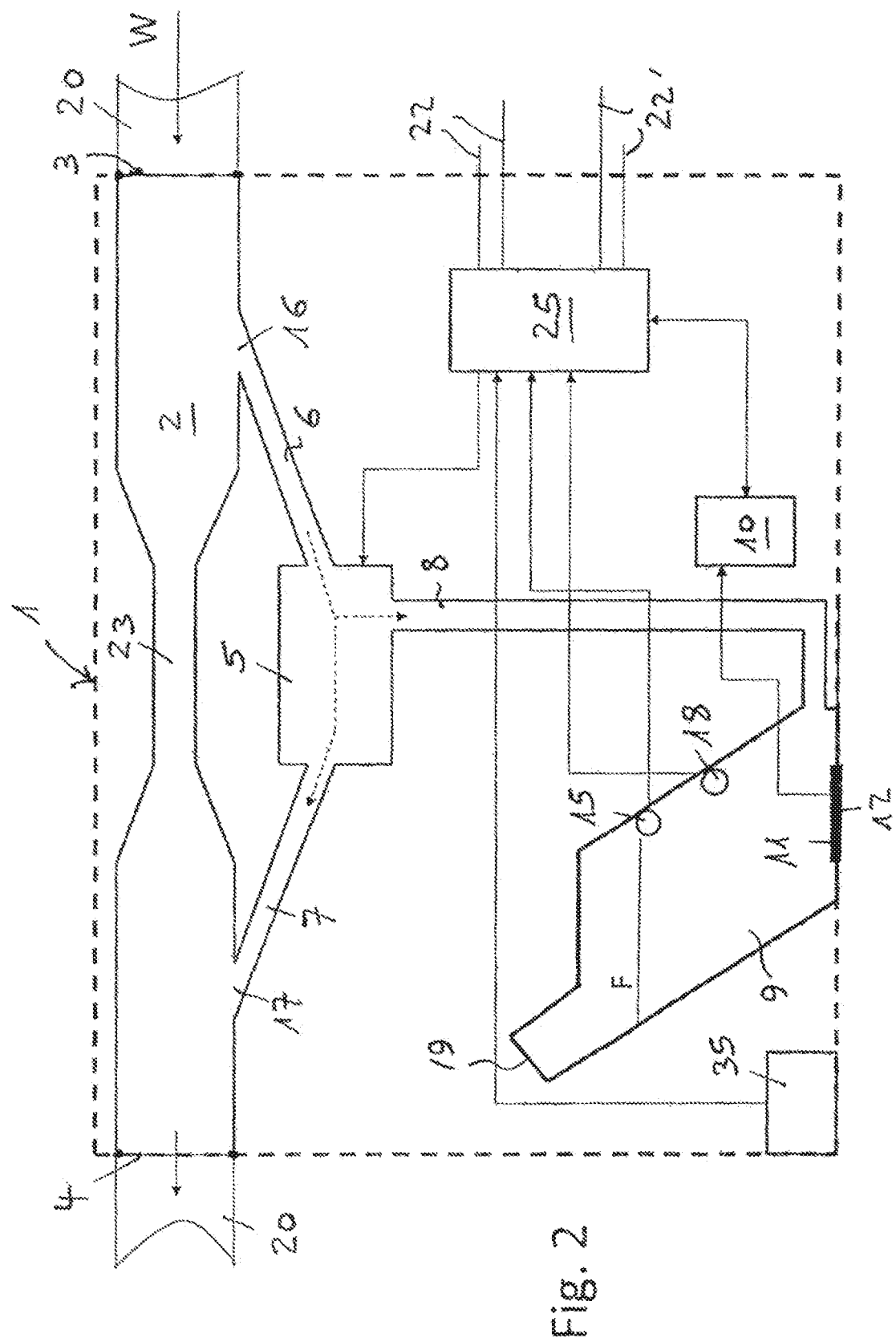
FIG. 2 shows schematically an embodiment of the device according to the invention.

FIG. 2 shows one of the devices 1 schematically in more detail. A duct 2 for letting water passing through the device 1 from an inlet connector 3 of the duct or device, respectively, to an outlet connector 4 of the duct or device is shown. The connectors for connecting the device 1 and thus the duct 2 to the water conduit 20 are just depicted schematically and with reference numerals 3 and 4. This can be standard water line connectors. Water will thus enter from conduit 20 under the pressure present in this conduit in direction W through connector 3 into duct 2 and the water will leave the duct into conduit 20 by connector 4. From the duct 2 a water line 6 connected to the duct 2 at an opening 16 thereof and leads to a valve arrangement 5 that is schematically shown only by a box. Dotted lines show different water flow directions provided by the valve arrangement 5 and will be explained in the following. From the valve arrangement 5 another water line 7 leads back to the duct 2 and is connected there to the duct 2 at an opening 17. A third water line 8 leads from the valve arrangement 5 to a reservoir 9. The valve arrangement 5 is controlled by a control circuit of the device 1 which will be called controller 25. This can be a control circuit based on a micro-computer well known to the skilled person. The controller 25 as well as the other components of device 1 which need electrical supply energy are supplied by electrical lines 22 already mentioned. If outside control signals are to be processed which enter via control lines 22' this will be done by controller 25 as well. The controller may thus receive signals from sensor 35 or may receive such sensors wirelessly as mentioned above. In this case the controller 25 is connected to a wireless receiver of device 1 not shown in this embodiment. The controller controls as well the activation and deactivation of the droplet generator 10 which includes mesh 11 that provides the droplet outlet 12 of the device 1.

The mesh 11 forms a part of the reservoir 9 such that water contained in the reservoir will be nebulized and will leave the device 1 at the outlet side 12 of the mesh.

Reservoir 9 is filled by controlling valve arrangement 5 via controller 25 such that the valve arrangement 5 connects water line 6 with water line 8 while the valve arrangement blocks water line 7. Water from duct 2 supplied from conduit 20 is thus filled into reservoir 9. Preferably line 8 leads into reservoir 9 near the mesh 11 so that the mesh surface is flushed by water entering the reservoir via line 8. Filling is only allowed up to an upper fill-level F which is shown with a dotted line in the drawing. To avoid overfilling, at least one fill sensor is provided that may preferably comprise a lower electrode and an upper electrode such that reaching the upper fill-level can be detected by a resistance measurement. When water is present between lower and upper fill-level electrodes the resistance measurement will give a lower value than without water connecting the electrodes. In the shown embodiment the lower electrode is provided by the mesh 11 itself which is at least partly electrically conductive so that it may serve as a fill-level electrode. The upper electrode 15 is a metal part within reservoir 9. Both electrodes 11, 15 are connected to controller 25 which effects the resistance measurement and can thus detect when the maximum fill-level has been reached. An intermediary electrode 18 may be provided as well. This electrode 18 is as well used by controller 25 to measure resistance between lower electrode 11 and electrode 18.

When the water has reached the maximum fill-level F in reservoir 9 controller 25 will control valve arrangement 5 to disconnect water line 8 from water line 6 and thus no further water will enter the reservoir. Controller 25 will then activate the droplet generator 10 which will vibrate mesh 11 so that a mist of water will leave device 1 at outlet 12. Thus the air in the respective compartment will be provided with extremely fine water droplets that will evaporate in the air of the compartment. Thus the compartment will be humidified and cooled. After the water in the reservoir 9 has been used up completely the step of filling the reservoir may be repeated if controller 25 still receives a message by sensor 35 that the controller interprets as a signal that even more humidification is needed. The filled up reservoir will then be emptied by nebulizing its content as well. If the preferred additional fill-level detection by intermediary electrode 18 is present, it is not necessary to empty the reservoir completely while a humidification request is sensor 35 is detected by controller 25. The reservoir can then be filled up already when its fill-level has reached electrode 18. So the reservoir 9 will not run empty as long as a humidification request is present. Only after no such request is present any more will the reservoir be emptied completely.

When the reservoir has been emptied and there is no need for further humidification, the reservoir will be left empty of water until a new request for humidification is recognised by controller 25. In this case the reservoir will be filled and nebulizing will start again. It is a preferred mode of operation of the device 1 that reservoir 9 is kept empty when no actual humidification is needed. In this way there is no or almost no residual water in the reservoir 9 and thus there are no concerns over the hygienic properties of the water.

When the reservoir has been filled up as mentioned, the controller 25 controls valve arrangement 5 such that water line 6—which is no longer connected to water line 8 and the reservoir, respectively—is then connected to water line 7 so that water entering water line 6, the valve arrangement 5 and then water line 7 exits the device via duct 2 and flows to conduit 20 connected to outflow connector 4. By this the lines 6 and 7 and the valve arrangement are cleaned all the time—except when the reservoir 9 is filled—with fresh water from the conduit 20 entering at inflow connector 3. This as well removes any concerns about residual water standing in lines 6 and 7 and in the valve arrangement. The flow through of fresh water occurs while the reservoir is emptied by nebulizing its content and while the device is in an "inactive" state with empty reservoir, waiting for a new request for nebulizing as triggered by a signal from a sensor 35. Of course, a main controller not shown may trigger a filling of reservoir 9 and nebulization as well for example over signal lines 22' connected to each device. This may be the case if the whole system with all devices 1 shall be activated for a functional control.

Reservoir 9 is preferably provided with a pressure equalization opening 19 that is provided at the reservoir away from the mesh 11 and above the maximum fill-level. This opening 19 will protect the mesh 11 from overpressure during filling and will avoid at any time that water pressure in the reservoir becomes too high. The opening 19 may be closed by an air-permeable particle-tight closure, in particular a hydrophobic membrane to avoid any contamination of the reservoir.

The duct 2 preferably comprises a throttle 23 to make sure that there will always be a flow through lines 6, 7 and the valve arrangement when and while this valve arrangement connects lines 6 and 7 bypassing the duct 2. The throttle can be formed by any throttling means known to the skilled person, for example by a section of said duct 2 with a lesser diameter.

Reservoir 9 is shaped such that all the water contained therein will be nebulized. Depending on the mounting of the device on a wall or on a ceiling of the compartment the reservoir may have a different shape so make sure that the reservoir can be emptied totally. There are then two kind of devices that must be selected by the installing person depending on the mounting. It is possible and is preferred to shape the reservoir such that the mesh will be on the lowest level regardless of the wall or ceiling mounting position. Such a reservoir is preferred and schematically shown in FIG. 2. It is as well possible to provide the reservoir 9 with two meshes in different places, so that a different mesh is in operation depending on the mounting position of the device.

Thus a humidification device is shown wherein water is nebulized by a vibrating mesh with very small holes. The mesh is part of a reservoir which is fed by a valve arrangement which allows to direct water from a conduit over several water lines within the device either back to the conduit or into the reservoir. The device and a system with such devices allow to humidify and/or cool compartments such as rooms with a very fine mist of water which is hardly visually detectable. The system and device is adapted to be part of a permanent installation with low maintenance.

While there are shown and described presently preferred embodiments of the invention, it is to be understood that the invention is not limited thereto but may be otherwise variously embodied and practised within the scope of the following claims.

The invention claimed is:

1. A device for producing water droplets comprising a through duct having an inflow connector and an outflow connector, a valve arrangement with water lines connecting to said duct and to a reservoir of the device, said valve arrangement being provided for filling the reservoir up to a predetermined fill-level, the reservoir being closed on one side by a perforated mesh of a droplet generator of the device, the mesh being arranged to be covered on one side of the mesh by water being present in said reservoir and the mesh forming the water droplet outlet of the device releasing droplets from the other side of the mesh when the mesh of the droplet generator is vibrated, and the device further comprising a control unit for controlling the valve arrangement and the droplet generator.

2. The device of claim 1, wherein the duct comprises a throttle and the valve arrangement is provided with a first line connecting with the duct at an upstream point of the duct ahead of the throttle and a second line connecting with the duct at a downstream point of the duct after the throttle, and with a third line leading to the reservoir, the valve arrangement being controllable by the control unit to connect in one position of the valve arrangement the first water line and the second water line with each other by the valve arrangement while the third water line is disconnected from the first and second water lines in this valve position and to connect in a second position of the valve arrangement the third water line and thus the reservoir with the duct, in particular by connecting the first water line with the third water line by the valve arrangement.

3. The device according to claim 1 wherein a low-level sensor is provided to detect a zero-level of water in said reservoir by a sensor signal and in particular wherein the low-level detector comprises the mesh.

4. The device according to claim 1 wherein a shape of the reservoir and a position of the mesh relative to the reservoir are mutually selected such that all water in the reservoir will be nebulized when the device is mounted in either of two orientations respectively providing a horizontal mesh position and a vertical mesh position.

5. The device according to claim 1 wherein the water line leading from the valve arrangement to the reservoir ends at the reservoir at a position that directs water entering the reservoir such that the water flushes the mesh surface within the reservoir.

6. The device according to claim 1 wherein said reservoir is provided with a pressure equalization opening at a point away from the mesh and above the fill-level of the reservoir.

7. The device according to claim 6 wherein the pressure equalization opening is provided with an air-permeable particle-tight closure.

8. The device according to claim 7 wherein the air-permeable particle-tight closure is a hydrophobic membrane.

9. The device according to claim 1 comprising a level detector arranged to detect the predetermined fill-level of water within the reservoir.

10. The device according to claim 9 wherein the level detector comprises a first fill-level electrode and a second fill-level electrode to provide for a measurement of electrical conductivity of water in said reservoir.

11. The device according to claim 10 wherein the level detector comprises a third electrode which is provided and arranged for detecting a further fill-level.

12. The device according to claim 10 wherein the second fill-level electrode is provided by the mesh itself.

13. A method of operation of a device according to claim 1 wherein upon a humidification request the reservoir is filled with water from the duct up to the fill-level by controlling the valve arrangement, that after the fill-level has been reached the valve arrangement stops further water supply to the reservoir, that the valve arrangement is continuously or regularly purged with water from the duct, and that water droplets are generated from the water contained in the reservoir by vibratingly driving the mesh.

14. The method of claim 13 wherein the reservoir is refilled upon an ongoing humidification request and in particular the reservoir is refilled when the water level in the reservoir has reached an additional, lower fill-level being detectable by an additional fill-level electrode arranged in the reservoir.

15. The method of claim 14 wherein that after the water in the reservoir has been fully used up when no humidification request is present any longer only the purging is continued while the reservoir is left empty.

16. A system for humidification or adiabatic cooling of several compartments, such as rooms or cabinets or terrariums, comprising a water conduit leading to the several compartments, devices according to claim 1 being connected in series to the water conduit and being arranged to release droplets into the respective compartment, and comprising at least one humidification sensor, and in particular one humidification sensor per compartment, that controls one or several devices by sending its signals to a corresponding controller of said devices.

* * * * *